US012243423B2

(12) United States Patent
Ran et al.

(10) Patent No.: US 12,243,423 B2
(45) **Date of Patent: *Mar. 4, 2025**

(54) PROACTIVE SENSING SYSTEMS AND METHODS FOR INTELLIGENT ROAD INFRASTRUCTURE SYSTEMS

(71) Applicant: CAVH LLC, Fitchburg, WI (US)

(72) Inventors: Bin Ran, Fitchburg, WI (US); Huachun Tan, Middleton, WI (US); Zhen Zhang, Madison, WI (US); Yang Cheng, Middleton, WI (US); Xiaotian Li, Madison, WI (US); Tianyi Chen, Madison, WI (US); Shuoxuan Dong, Madison, WI (US); Kunsong Shi, Madison, WI (US)

(73) Assignee: CAVH LLC, Fitchburg, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/878,988

(22) Filed: Aug. 2, 2022

(65) Prior Publication Data

US 2022/0406184 A1 Dec. 22, 2022

Related U.S. Application Data

(63) Continuation of application No. 16/751,492, filed on Jan. 24, 2020, now Pat. No. 11,436,923.

(60) Provisional application No. 62/796,621, filed on Jan. 25, 2019.

(51) Int. Cl.

*G08G 1/123* (2006.01)
*G08G 1/017* (2006.01)

(52) U.S. Cl.

CPC ............ *G08G 1/123* (2013.01); *G08G 1/017* (2013.01)

(58) Field of Classification Search

CPC .. G08G 1/123; G08G 1/017; G08G 1/096716; G08G 1/096725; G08G 1/096783; G08G 1/052; G08G 1/22

See application file for complete search history.

(56) References Cited

U.S. PATENT DOCUMENTS

| | | | | |
|---|---|---|---|---|
| 7,102,496 | B1 | 9/2006 | Ernst et al. | |
| 7,629,899 | B2 | 12/2009 | Breed | |
| 9,381,916 | B1 | 7/2016 | Zhu | |
| 9,418,546 | B1 * | 8/2016 | Whiting | G08G 1/0133 |
| 10,380,886 | B2 | 8/2019 | Ran et al. | |
| 10,692,365 | B2 | 6/2020 | Ran et al. | |
| 11,436,923 | B2 * | 9/2022 | Ran | G08G 1/096725 |
| 2005/0027436 | A1 | 2/2005 | Yoshikawa et al. | |
| 2010/0104138 | A1 | 4/2010 | Fardi | |
| 2012/0083960 | A1 | 4/2012 | Zhu et al. | |
| 2014/0070960 | A1 | 3/2014 | Sung et al. | |
| 2016/0267790 | A1 | 9/2016 | Raamot | |
| 2016/0323233 | A1 | 11/2016 | Song et al. | |
| 2017/0096074 | A1 | 4/2017 | Ashton et al. | |
| 2017/0123428 | A1 * | 5/2017 | Levinson | G05D 1/0231 |
| 2017/0148311 | A1 | 5/2017 | Kashiwakura et al. | |

(Continued)

*Primary Examiner* — Daryl C Pope

(74) *Attorney, Agent, or Firm* — Thomas A. Isenbarger; Casimir Jones, S.C.

(57) ABSTRACT

The technology provided herein relates to a roadside infrastructure sensing system for Intelligent Road Infrastructure Systems (IRIS) and, in particular, to devices, systems, and methods for data fusion and communication that provide proactive sensing support to connected and automated vehicle highway (CAVH) systems.

20 Claims, 3 Drawing Sheets

(56) References Cited

U.S. PATENT DOCUMENTS

| | | | |
|---|---|---|---|
| 2018/0102943 | A1 | 4/2018 | Movsisyan |
| 2018/0286225 | A1* | 10/2018 | Lu ........................ G08G 1/0133 |
| 2019/0205659 | A1 | 7/2019 | Cuban et al. |
| 2019/0232800 | A1 | 8/2019 | Ashton et al. |
| 2019/0244518 | A1 | 8/2019 | Cheng et al. |
| 2019/0244521 | A1 | 8/2019 | Ran et al. |
| 2019/0311616 | A1 | 10/2019 | Jin et al. |
| 2019/0347931 | A1 | 11/2019 | Ding et al. |
| 2020/0005633 | A1 | 1/2020 | Jin et al. |
| 2020/0196240 | A1 | 6/2020 | Zhang et al. |

* cited by examiner

PROACTIVE SENSING SYSTEMS AND METHODS FOR INTELLIGENT ROAD INFRASTRUCTURE SYSTEMS

This application is a continuation of U.S. application Ser. No. 16/751,492, filed Jan. 24, 2022, which claims priority to U.S. provisional patent application Ser. No. 62/796,621, filed Jan. 25, 2019, each of which is incorporated herein by reference in its entirety.

FIELD

The technology provided herein relates to a roadside infrastructure sensing system for Intelligent Road Infrastructure Systems (IRIS) and, in particular, to devices, systems, and methods (e.g., for sensing, data fusion, and communication) that provide proactive sensing support to connected and automated vehicle highway (CAVH) systems. In some embodiments, the sensing systems comprise multiple kinds of sensors to provide embodiments of the technology suitable for dedicated and non-dedicated lanes of roadways and highways. In some embodiments, multiple levels of data fusion are performed to provide proactive sensing. In some embodiments, the sensing systems and methods are deployed with IRIS and transmit fused information to IRIS through wired and wireless communication to support functions of connected and automated vehicle highway (CAVH) systems.

BACKGROUND

Autonomous vehicles, which can sense their environment, detect objects, and navigate without human involvement, are in development. However, this technology is presently insufficient for commercial use. For example, existing autonomous vehicle technologies require expensive, complicated, and energy inefficient on-board systems, use of multiple sensing systems, and rely mostly on vehicle sensors for vehicle control. Accordingly, implementation of automated vehicle systems is a substantial challenge.

SUMMARY

Accordingly, embodiments of the present technology provide devices, systems, and methods for a roadside infrastructure sensing system. In some embodiments, the technology provided herein finds use in an Intelligent Road Infrastructure System (IRIS), which is, in some embodiments, a subsystem of a connected and automated vehicle highway (CAVH) system (see, e.g., U.S. patent application Ser. Nos. 15/628,331 and 16/135,916, each of which is incorporated herein by reference, describing aspects of CAVH systems and IRIS systems). As described in U.S. patent application Ser. Nos. 15/628,331 and 16/135,916, each of which is incorporated herein by reference, IRIS technologies support vehicle operations and control for CAVH systems and are configured to increase and/or maximize efficiency and/or robustness of the CAVH system. The technology described herein provides additional embodiments of IRIS sensing systems that improve CAVH systems by providing additional functions for CAVH support. For example, particular embodiments relate to a sensing technology comprising multiple kinds of sensors. In some embodiments, the technology is suitable for dedicated and/or non-dedicated lanes of roadways and highways. In some embodiments, sensing data are collected and processed (e.g., data fusion). In some embodiments, sensor-level data fusion is performed on sensing data, environmental data, and/or historical data to provide proactive sensing. The sensing system is provided as a component of an IRIS and transmits fused information to IRIS (e.g., using wired and/or wireless connection) to support functions of a CAVH.

Accordingly, in some embodiments the technology provided herein is related to a roadside infrastructure sensing system. In some embodiments, the roadside infrastructure sensing system comprises a data collection subsystem; a data processing subsystem; and a sensor-level data fusion subsystem. In some embodiments, the roadside infrastructure sensing system is configured to deploy sensors and/or to allocate resources for sensors for scenes to provide different sensing functions for different sensing points on a road. In some embodiments, the roadside infrastructure sensing system is configured to deploy sensors and/or to allocate resources for scenes to provide full coverage of a sensing point on a road. In some embodiments, the roadside infrastructure sensing system is configured to deploy sensors and/or to allocate resources for scenes based on data describing the distance and/or angle between the sensing point and sensor. In some embodiments, the roadside infrastructure sensing system is configured to deploy sensors and/or to allocate resources for scenes based on data describing the effective range of a sensor.

In some embodiments, the roadside infrastructure sensing system is configured to sense static objects and to generate a background scene comprising said static objects. In some embodiments, the roadside infrastructure sensing system is configured to sense dynamic objects during times of high traffic volumes and update the background scene during times of low traffic volumes. In some embodiments, the roadside infrastructure sensing system is configured to update the background scene when spare resources (e.g., electrical power, computing power (e.g., computing cycles, memory use, storage use, power consumption, data throughput), communication bandwidth, sensing (e.g., obtaining and/or recording data from a sensor), sensing frequency (e.g., sampling rate), sensor coverage (e.g., sensors per unit area or linear dimension of a road), and/or data fusion capability) are available (e.g., when sufficient resources are available to sense dynamic objects and to update the background scene and/or when sufficient resources are available to update the background scene regardless of the number of dynamic objects in the scene).

In some embodiments, the roadside infrastructure sensing system is configured to sense, track, and/or update the positions and/or velocities of dynamic objects during times of high traffic volume and the roadside infrastructure sensing system is configured to update the background during times of low traffic volume or when sufficient resources are available (e.g., the roadside infrastructure sensing system is configured to sense, track, and/or update the positions and/or velocities of static objects, slow moving objects, and/or non-vehicle objects such as, e.g., pedestrians, animals, etc.) Accordingly, the technology provides a roadside infrastructure sensing system that is configured to allocate resources to monitor and control traffic flow in high priority areas (e.g., high traffic areas or in areas during times of high traffic volumes) and perform other tasks (e.g., sensing the background) in low priority areas (e.g., low traffic areas or in areas during times of low traffic volumes) or when sufficient resources are available to provide sufficient coverage and services to high priority areas and use any remaining (e.g., spare, excess) resources to update background (e.g., in lower priority areas).

In some embodiments, the roadside infrastructure sensing system is configured to sense dynamic objects and to generate a dynamic scene comprising said dynamic objects. In some embodiments, the roadside infrastructure sensing system is configured to update the positions and/or velocities of dynamic objects during high traffic volumes.

In some embodiments, the technology adjusts the allocation of resources among installed sensors. In some embodiments, the technology deploys additional sensors (e.g., mobile sensing components) to regions determined to need additional sensing.

In some embodiments, the roadside infrastructure sensing system is configured to sense and compile data vehicle identification information, vehicle global position, vehicle relative position, vehicle velocities, and vehicle attributes. In some embodiments, the roadside infrastructure sensing system is configured to synchronize data in time or space.

In some embodiments, the roadside infrastructure sensing system is configured to provide passive sensing comprising active RSU sensors sensing the environment and objects of a scene. In some embodiments, the roadside infrastructure sensing system is configured to provide proactive sensing comprising sensing the environment by a sensor identified as a high priority sensor using a priority system ranking a plurality of sensors. In some embodiments, the roadside infrastructure sensing system is configured to provide proactive sensing comprising sensing the environment of specific road segments and/or at specific times identified by a Traffic Control Unit/Traffic Control Center. In some embodiments, the roadside infrastructure sensing system is configured to provide proactive sensing comprising sensing the environment of specific road segments based on special scheduled events identified by a TCU/TCC.

In some embodiments, the roadside infrastructure sensing system is configured to detect moving and static objects on a road and/or near a road. In some embodiments, the roadside infrastructure sensing system is configured to classify vehicles, motorcycles, bicycles, pedestrians, and animals. In some embodiments, the roadside infrastructure sensing system is configured to identify the location of vehicles. In some embodiments, the roadside infrastructure sensing system is configured to segment a plurality of vehicles on a road using lane markings.

In some embodiments, the roadside infrastructure sensing system is configured to track objects on a road and/or near a road. In some embodiments, the roadside infrastructure sensing system is configured to track objects on a road and/or near a road using data and information from sensors at different locations.

In some embodiments, the roadside infrastructure sensing system comprises a camera or radar. In some embodiments, the camera is a video camera, an infrared camera, and/or thermal imaging camera. In some embodiments, the radar is a microwave radar, a LiDAR, an ultrasonic radar, and/or a millimeter radar. In some embodiments, the roadside infrastructure sensing system comprises an RFID detector, a thermometer, a Wi-Fi radio, a dedicated short-range communications (DSRC) radio, and/or a Bluetooth radio.

In some embodiments, the roadside infrastructure sensing system is configured to identify major sensing points for which sensors track and provide sensor data for vehicles, bicycles, pedestrians, lane markings, traffic signs, and static objects. In some embodiments, the roadside infrastructure sensing system is configured to track and provide sensor data for vehicles, bicycles, pedestrians, lane markings, traffic signs, and static objects at a major sensing point. In some embodiments, a major sensing point is an intersection, roundabout, or work zone. In some embodiments, the roadside infrastructure sensing system is configured to identify minor sensing points for which sensors detect and track vehicles and static objects. In some embodiments, the roadside infrastructure sensing system is configured to detect and track vehicles and static objects at a minor sensing point.

In some embodiments, the roadside infrastructure sensing system comprises a mobile sensing component. In some embodiments, the mobile sensing component comprises a vehicle-based mobile sensing component comprising vehicle-based sensing. In some embodiments of the roadside infrastructure sensing system, vehicles comprising sensors and/or sensing functions send sensor data to the system. In some embodiments, the mobile sensing component comprises a drone-based mobile sensing component comprising drone-based sensing from drones in the air. In some embodiments of the roadside infrastructure sensing system, airborne drones comprising sensors and/or sensing functions send sensor data to the system.

Also provided herein are methods employing any of the systems described herein for the management of one or more aspects of traffic control. The methods include those processes undertaken by individual participants in the system (e.g., drivers, public or private local, regional, or national transportation facilitators, government agencies, etc.) as well as collective activities of one or more participants working in coordination or independently from each other.

For example, in some embodiments, the technology provides a method for providing data to Intelligent Road Infrastructure Systems (IRIS). In some embodiments, methods comprise fusing sensor-level data from a plurality of sensors to produce fused sensor data and communicating said fused sensor data to an IRIS. In some embodiments, methods comprise communicating fused sensor data to a CAVH system. In some embodiments, methods comprise allocating CAVH resources to sensors based on fused sensor data. In some embodiments, methods comprise predicting sensor requirements based on fused sensor data. In some embodiments, methods comprise deploying sensors to sensing points based on fused sensor data. In some embodiments, the sensor-level data comprises information describing static objects. In some embodiments, the sensor-level data comprises information describing dynamic objects. In some embodiments, methods comprise updating the positions and/or velocities of dynamic objects during high traffic volumes. In some embodiments, methods comprise updating the positions of static objects during low traffic volumes. In some embodiments, methods comprise synchronizing sensor-level data from a plurality of sensors in time or in space. In some embodiments, methods comprise generating a background scene comprising static objects. In some embodiments, methods comprise updating a background scene during times of both high and low traffic volumes. In some embodiments, methods comprise sensing and collecting data vehicle identification information, vehicle global position, vehicle relative position, vehicle velocity, and vehicle attributes. In some embodiments, methods comprise identifying a sensor as a high priority sensor using a priority system ranking a plurality of sensors, using data describing the environment of specific road segments, and/or at specific times identified by a Traffic Control Unit/Traffic Control Center. In some embodiments, methods comprise classifying vehicles, motorcycles, bicycles, pedestrians, and animals. In some embodiments, methods comprise identifying the location of vehicles. In some embodiments, methods comprise segmenting vehicles on a road using lane markings. In some embodiments, methods comprise tracking objects on a road and/or near a road using data and information from sensors at different locations. In some embodiments, methods comprise identifying major sensing points for which sensors track and provide sensor data for vehicles, bicycles, pedestrians, lane markings, traffic signs, and static objects. In some embodiments, methods comprise tracking and providing sensor data for vehicles, bicycles, pedestrians, lane markings, traffic signs, and static objects at a major sensing point.

In some embodiments, the technology provides use of a roadside infrastructure sensing system comprising a data collection subsystem; a data processing subsystem; and a sensor-level data fusion subsystem to provide data to an IRIS or a CAVH system for proactive sensing and resource allocation. In some embodiments, the technology relates to use of a system or method as described herein to provide data to an IRIS or a CAVH system.

Some portions of this description describe the embodiments of the technology in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times to refer to these arrangements of operations as modules without loss of generality. The described operations and their associated modules may be embodied in software, firmware, hardware, or any combinations thereof.

Certain steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all steps, operations, or processes described.

Embodiments of the technology may also relate to an apparatus for performing the operations described herein. This apparatus may be specially constructed for the required purposes and/or it may comprise a general-purpose computing device selectively activated or reconfigured by a computer program stored in the computer. Such a computer program may be stored in a non-transitory, tangible computer readable storage medium or any type of media suitable for storing electronic instructions, which may be coupled to a computer system bus. Furthermore, any computing systems referred to in the specification may include a single processor or may be architectures employing multiple processor designs for increased computing capability.

DEFINITIONS

Figure 1:
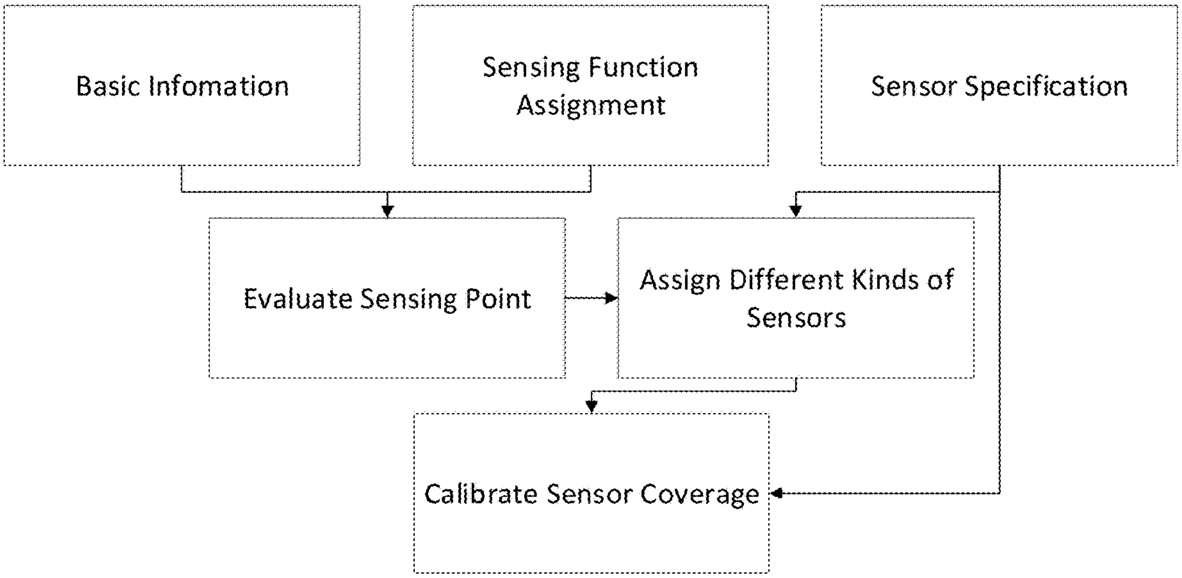
FIG. 1 is a block diagram showing information flow for embodiments of the roadside infrastructure sensing system described herein.

To facilitate an understanding of the present technology, terms and phrases are defined below. Additional definitions are set forth throughout the detailed description.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator and is equivalent to the term "and/or" unless the context clearly dictates otherwise. The term "based on" is not exclusive and allows for being based on additional factors not described, unless the context clearly dictates otherwise. In addition, throughout the specification, the meaning of "a", "an", and "the" include plural references. The meaning of "in" includes "in" and "on."

As used herein, the terms "about", "approximately", "substantially", and "significantly" are understood by persons of ordinary skill in the art and will vary to some extent on the context in which they are used. If there are uses of these terms that are not clear to persons of ordinary skill in the art given the context in which they are used, "about" and "approximately" mean plus or minus less than or equal to 10% of the particular term and "substantially" and "significantly" mean plus or minus greater than 10% of the particular term.

As used herein, the suffix "-free" refers to an embodiment of the technology that omits the feature of the base root of the word to which "-free" is appended. That is, the term "X-free" as used herein means "without X", where X is a feature of the technology omitted in the "X-free" technology. For example, a "sensing-free" method does not comprise a sensing step, a "controller-free" system does not comprise a controller, etc.

As used herein, the term "support" when used in reference to one or more components of the CAVH system providing support to and/or supporting one or more other components of the CAVH system refers to, e.g., exchange of information and/or data between components and/or levels of the CAVH system, sending and/or receiving instructions between components and/or levels of the CAVH system, and/or other interaction between components and/or levels of the CAVH system that provide functions such as information exchange, data transfer, messaging, and/or alerting.

As used herein, the term "IRIS system component" refers individually and/or collectively to one or more of an OBU, RSU, TCC, TCU, TCC/TCU, TOC, and/or CAVH cloud component.

As used herein, the term "data synchronization" refers to identifying data from one or more sensors that was collected at the same time, substantially same time, and/or effectively the same time ("synchronized in time") or at the same location, substantially the same location, and/or effectively the same location ("synchronized in space"). In some embodiments, data that are "synchronized in time" share a common timescale, e.g., to identify data collected at the same time (e.g., for different types of sensors and/or for sensors that operate at different frequencies). In some embodiments, data that are "synchronized in space" are identified using a common coordinate system (e.g., for sensors at different RSUs or for different sensors at the same RSU). In some embodiments, "data synchronization" identifies data collected from different sensors and/or at different locations that describe the same event, object, and/or vehicle.

As used herein, the term "scene" refers to an environment in which a vehicle operates or in which an object sensed by the CAVH system operates and/or is present. In some embodiments, a "scene" is a view of an object or of a volume of space from a particular point and looking in a particular direction in three-dimensional space. In some embodiments, a "scene" comprises static and/or dynamic objects sensed by the CAVH system. In some embodiments, static and/or dynamic objects in a scene are identified by coordinates within the scene. In some embodiments, the technology provides (e.g., constructs) a scene that is a virtual model or reproduction of the scene sensed by the CAVH system. Accordingly, in some embodiments, a "scene" (e.g., the environment sensed by a vehicle and/or the composite of information sensed by an IRIS or CAVH system describing the environment of the vehicle) changes as a function of time (e.g., as a function of the movement of vehicles and/or objects in the scene). In some embodiments, a "scene" for a particular vehicle changes as a function of the motion of the vehicle through a three-dimensional space (e.g., change in location of a vehicle in three-dimensional space).

As used herein, the term "sensing point" refers to a portion or region of a road that is identified as appropriate to be provided with increased allocation of sensing resources by a CAVH system. In some embodiments, a sensing point is categorized as a "static sensing point" and in some embodiments, a sensing point is categorized as a "dynamic sensing point". As used herein, a "static sensing point" is a point (e.g., region or location) of a road that is a sensing point based on identification of road and/or traffic conditions that are generally constant or that change very slowly (e.g., on a time scale longer than a day, a week, or a month) or only by planned reconstruction of infrastructure. As used herein, a "dynamic sensing point" is a point (e.g., region or location) of a road that is a sensing point based on identification of road conditions that change (e.g., predictably or not predictably) with time (e.g., on a time scale of an hour, a day, a week, or a month). Sensing points based on historical crash data, traffic signs, traffic signals, traffic capacity, and road geometry are exemplary static sensing points. Sensing points based on traffic oscillations, real-time traffic management, or real-time traffic incidents are exemplary dynamic sensing points.

As used herein, the term "proactive sensing" or "predictive sensing" describes identifying an anticipated need to adjust the number of sensors, the sensing frequency (e.g., sampling rate), and/or types of sensors collecting data for a region of a CAVH system based on real-time sensing data, historical data, event schedule data, location data, weather data, traffic incident data, road geometry data, or a directive from a TCU/TCC or TOC that a future sensing need for the region will be higher, lower, or otherwise different than the present sensing need. The proactive sensing technology provides for a managed resource allocation among CAVH components and, in some embodiments, maximizes efficient distribution of resources (e.g., communications bandwidth, power, computational capacity), maximizes safety, maximizes efficiency of traffic flow, and/or maximizes CAVH component lifetime. As used herein, "proactive sensing" comprises a centralized collection of sensor data and data fusion of sensor data with historical sensor data, calendared scheduled event data, weather data, traffic incident data, road geometry data, and other traffic data to develop a model, input data to a previously developed model, identify an efficient allocation of increased, decreased, or qualitatively different sensing needs in the CAVH system, and send commands to CAVH components to adjust sensing type or rate accordingly.

DETAILED DESCRIPTION

In some embodiments, the technology provided herein relates to a roadside infrastructure sensing system for Intelligent Road Infrastructure Systems (IRIS) and, in particular, to devices, systems, and methods for data fusion and communication that provide proactive sensing support to connected and automated vehicle highway (CAVH) systems.

In some embodiments, the present technology relates to an intelligent road infrastructure system and, more particularly, to systems and methods for a connected automated vehicle highway (CAVH) network in which resources are apportioned among sensors (e.g., both vehicle-based and/or infrastructure-based (e.g., RSU-based and/or mobile-based) sensors) to optimize sensing coverage of particular areas (e.g., high traffic areas, sensing points, traffic events, weather events, etc.). In some embodiments, sensors in low traffic areas sense the background of the environment, e.g., to provide a baseline scene or collection of static objects for a scene. Dynamic objects (e.g., vehicles, animals, pedestrians) move with respect to the background of the scene. In some embodiments, resources are allocated to sense the dynamic objects in the scene and/or to increase sensing of dynamic objects. In some embodiments, the CAVH system determines resource allocation based on passive (e.g., real-time) sensing data indicating where traffic volumes are highest in the system and/or where an event has occurred (e.g., a traffic accident, a weather event) that is appropriate for increased allocation of sensing resources. In some embodiments, the CAVH system determines resource allocation based on proactive (e.g., predictive) identification of regions where increased sensing is or will be needed (e.g., based on historical traffic data, scheduled special events that increase traffic volume, weather forecast, seasonal animal migrations, etc.)

In some embodiments, the technology provides a vehicle operations and control system comprising one or more of a roadside unit (RSU) network; a Traffic Control Unit (TCU) and Traffic Control Center (TCC) network (e.g., TCU/TCC network); a vehicle comprising an onboard unit (OBU); and/or a Traffic Operations Center (TOC).

Embodiments provide an RSU network comprising one or more RSUs. In some embodiments, RSUs have a variety of functionalities. For example, embodiments of RSUs comprise one or more components, sensors, and/or modules as described herein in relation to the RSU. For example, in some embodiments RSUs provide real-time vehicle environment sensing and traffic behavior prediction and send instantaneous control instructions for individual vehicles through OBUs.

In some embodiments, the technology provides a system (e.g., a vehicle operations and control system comprising one or more of an RSU network; a TCU/TCC network; a vehicle comprising an onboard unit OBU; a TOC; and a cloud-based platform configured to provide information and computing services; see, e.g., U.S. Provisional Patent Application Ser. No. 62/691,391, incorporated herein by reference in its entirety) configured to provide sensing functions, transportation behavior prediction and management functions, planning and decision making functions, and/or vehicle control functions. In some embodiments, the system comprises wired and/or wireless communications media. In some embodiments, the system comprises a power supply network. In some embodiments, the system comprises a cyber-safety and security system. In some embodiments, the system comprises a real-time communication function.

In some embodiments, the RSU network comprises an RSU and/or an RSU subsystem. In some embodiments, an RSU comprises one or more of: a sensing module configured to measure characteristics of the driving environment; a communication module configured to communicate with vehicles, TCUs, and the cloud; a data processing module configured to process, fuse, and compute data from the sensing and/or communication modules; an interface module configured to communicate between the data processing module and the communication module; and an adaptive power supply module configured to provide power and to adjust power according to the conditions of the local power grid. In some embodiments, the adaptive power supply module is configured to provide backup redundancy. In some embodiments, a communication module communicates using wired or wireless media. See, e.g., U.S. patent application Ser. No. 16/135,916, incorporated herein by reference. In some embodiments, the sensors and/or data collection (e.g., sampling) frequencies of CAVH (e.g., RSU) sensors are managed by the CAVH system (e.g., by a TCU/TCC) to allocate system resources to RSUs where sensing is needed most and/or where more types of sensing data are needed, e.g., to maximize the efficiency and resource use (e.g., power, communications bandwidth) of the CAVH system.

In some embodiments, a sensing module comprises a radar-based sensor. In some embodiments, a sensing module comprises a vision-based sensor. In some embodiments, a sensing module comprises a radar-based sensor and a vision-based sensor and wherein said vision-based sensor and said radar-based sensor are configured to sense the driving environment and vehicle attribute data. In some embodiments, the radar-based sensor is a LIDAR, microwave radar, ultrasonic radar, or millimeter radar. In some embodiments, the vision-based sensor is a camera, infrared camera, or thermal camera. In some embodiments, the camera is a color camera. See, e.g., U.S. patent application Ser. No. 16/135,916, incorporated herein by reference.

In some embodiments, the sensing module comprises a satellite-based navigation system and/or is configured to receive data from a satellite-based navigation system. In some embodiments, the sensing module comprises an inertial navigation system. In some embodiments, the sensing module comprises a satellite-based navigation system and an inertial navigation system and wherein said sensing module comprises a satellite-based navigation system and said inertial navigation system are configured to provide vehicle location data. As used herein, the term "satellite-based navigation system" refers to a Global Positioning System (GPS), a Differential Global Positioning System (DGPS), a BeiDou Navigation Satellite System (BDS) System, or a GLONASS Global Navigation Satellite System. In some embodiments, the inertial navigation system comprises an inertial reference unit. See, e.g., U.S. patent application Ser. No. 16/135,916, incorporated herein by reference.

In some embodiments, the sensing module comprises a vehicle identification device. In some embodiments, the vehicle identification device is configured to receive vehicle identification data from an RFID component, Bluetooth component, Wi-fi (IEEE 802.11) component, a dedicated short-range communications (DSRC) radio, or a cellular network radio, e.g., a 4G or 5G cellular network radio. See, e.g., U.S. patent application Ser. No. 16/135,916, incorporated herein by reference.

In some embodiments, the RSU is deployed at a fixed location near road infrastructure (e.g., near a sensing point; near a non-sensing point). In some embodiments, the RSU is deployed at a sensing point, e.g., at a highway roadside, a highway on-ramp, a highway off-ramp, an interchange, a bridge, a tunnel, a toll station, or on a drone over a sensing point. In some embodiments, the RSU is deployed on a mobile component. In some embodiments, the RSU is deployed on a vehicle drone or on an unmanned aerial vehicle (UAV) over a critical location (e.g., a dynamic sensing point), e.g., at a site of traffic congestion, at a site of a traffic accident, at a site of highway construction, or at a site of extreme weather. In some embodiments, a RSU is positioned according to road geometry, heavy vehicle size, heavy vehicle dynamics, heavy vehicle density, and/or heavy vehicle blind zones. In some embodiments, the RSU is installed on a gantry (e.g., an overhead assembly, e.g., on which highway signs or signals are mounted). In some embodiments, the RSU is installed using a single cantilever or dual cantilever support.

In some embodiments, the TCC network is configured to provide traffic operation optimization, data processing, data archiving, and/or resource allocation. In some embodiments, the TCC network comprises a human operations interface. In some embodiments, the TCC network is a macroscopic TCC, a regional TCC, or a corridor TCC based on the geographical area covered by the TCC network. See, e.g., U.S. patent application Ser. No. 15/628,331, filed Jun. 20, 2017, and United States Provisional Patent Application Ser. No. 62/626,862, filed Feb. 6, 2018, 62/627,005, filed Feb. 6, 2018, 62/655,651, filed Apr. 10, 2018, and 62/669,215, filed May 9, 2018, each of which is incorporated herein in its entirety for all purposes.

In some embodiments, the TCU network is configured to provide real-time vehicle control, data processing, and/or resource management and allocation. In some embodiments, the real-time vehicle control and data processing are automated based on preinstalled algorithms.

In some embodiments, the TCU network comprises segment TCU and/or point TCUs based on the geographical area covered by the TCU network. See, e.g., U.S. patent application Ser. No. 15/628,331, filed Jun. 20, 2017 and United States Provisional Patent Application Ser. Nos. 62/626,862, filed Feb. 6, 2018, 62/627,005, filed Feb. 6, 2018, 62/655,651, filed Apr. 10, 2018, and 62/669,215, filed May 9, 2018, each of which is incorporated herein in its entirety for all purposes. In some embodiments, the system comprises a point TCU physically combined or integrated with an RSU. In some embodiments, the system comprises a segment TCU physically combined or integrated with a RSU.

In some embodiments, the TCC network comprises macroscopic TCCs configured to process information from regional TCCs and provide control targets to regional TCCs; regional TCCs configured to process information from corridor TCCs and provide control targets to corridor TCCs; and corridor TCCs configured to process information from macroscopic and segment TCUs and provide control targets to segment TCUs. See, e.g., U.S. patent application Ser. No. 15/628,331, filed Jun. 20, 2017 and United States Provisional Patent Application Ser. Nos. 62/626,862, filed Feb. 6, 2018, 62/627,005, filed Feb. 6, 2018, 62/655,651, filed Apr. 10, 2018, and 62/669,215, filed May 9, 2018, each of which is incorporated herein in its entirety for all purposes.

In some embodiments, the TCU network comprises: segment TCUs configured to process information from corridor and/or point TOCs and provide control targets to point TCUs; and point TCUs configured to process information from the segment TCU and RSUs and provide vehicle-based control instructions to an RSU. See, e.g., U.S. patent application Ser. No. 15/628,331, filed Jun. 20, 2017 and United States Provisional Patent Application Ser. Nos. 62/626,862, filed Feb. 6, 2018, 62/627,005, filed Feb. 6, 2018, 62/655,651, filed Apr. 10, 2018, and 62/669,215, filed May 9, 2018, each of which is incorporated herein in its entirety for all purposes. See, e.g., U.S. patent application Ser. No. 16/135,916, incorporated herein by reference.

In some embodiments, the RSU network and/or a RSU provides vehicles with customized traffic information and control instructions and/or receives information provided by vehicles.

In some embodiments, the TCC network comprises one or more TCCs comprising a connection and data exchange module configured to provide data connection and exchange between TCCs. In some embodiments, the connection and data exchange module comprises a software component providing data rectify, data format convert, firewall, encryption, and decryption methods. In some embodiments, the TCC network comprises one or more TCCs comprising a transmission and network module configured to provide communication methods for data exchange between TCCs. In some embodiments, the transmission and network module comprises a software component providing an access function and data conversion between different transmission networks within the cloud platform. In some embodiments, the TCC network comprises one or more TCCs comprising a service management module configured to provide data storage, data searching, data analysis, information security, privacy protection, and network management functions. In some embodiments, the TCC network comprises one or more TCCs comprising an application module configured to provide management and control of the TCC network. In some embodiments, the application module is configured to manage cooperative control of vehicles and roads, system monitoring, emergency services, and human and device interaction.

In some embodiments, the TCU network comprises one or more TCUs comprising a sensor and control module configured to provide the sensing and control functions of an RSU. In some embodiments, the sensor and control module is configured to provide the sensing and control functions of radar, camera, RFID, and/or V2I (vehicle-to-infrastructure) equipment. In some embodiments, the sensor and control module comprises a DSRC, GPS, 4G, 5G, and/or wife radio. In some embodiments, the TCU network comprises one or more TCUs comprising a transmission and network module configured to provide communication network functions for data exchange between an automated vehicle and a RSU. In some embodiments, the TCU network comprises one or more TCUs comprising a service management module configured to provide data storage, data searching, data analysis, information security, privacy protection, and network management. In some embodiments, the TCU network comprises one or more TCUs comprising an application module configured to provide management and control methods of an RSU. In some embodiments, the management and control methods of an RSU comprise local cooperative control of vehicles and roads, system monitoring, and emergency service. In some embodiments, the TCC network comprises one or more TCCs further comprising an application module and said service management module provides data analysis for the application module. In some embodiments, the TCU network comprises one or more TCUs further comprising an application module and said service management module provides data analysis for the application module.

In some embodiments, the TOC comprises interactive interfaces. In some embodiments, the interactive interfaces provide control of said TCC network and data exchange. In some embodiments, the interactive interfaces comprise information sharing interfaces and vehicle control interfaces. In some embodiments, the information sharing interfaces comprise: an interface that shares and obtains traffic data; an interface that shares and obtains traffic incidents; an interface that shares and obtains passenger demand patterns from shared mobility systems; an interface that dynamically adjusts prices according to instructions given by said vehicle operations and control system; an interface that allows a special agency (e.g., a vehicle administrative office or police) to delete, change, and share information; and/or an interface that allows a special agency (e.g., a vehicle administrative office or police) to identify a sensing point at a location on a road. In some embodiments, the vehicle control interfaces comprise: an interface that allows said vehicle operations and control system to assume control of vehicles; an interface that allows vehicles to form a platoon with other vehicles; and/or an interface that allows a special agency (e.g., a vehicle administrative office or police) to assume control of a vehicle. In some embodiments, the traffic data comprises vehicle density, vehicle velocity, and/or vehicle trajectory. In some embodiments, the traffic data is provided by the vehicle operations and control system and/or other share mobility systems. In some embodiments, traffic incidents comprise extreme conditions, major accident, and/or a natural disaster. In some embodiments, a sensing point is identified at the location of a traffic incident. In some embodiments, an interface allows the vehicle operations and control system to assume control of vehicles upon occurrence of a traffic event, extreme weather, or pavement breakdown when alerted by said vehicle operations and control system and/or other share mobility systems. In some embodiments, an interface allows vehicles to form a platoon with other vehicles when they are driving in the same dedicated and/or same non-dedicated lane.

In some embodiments, the OBU comprises a communication module configured to communicate with an RSU. In some embodiments, the OBU comprises a communication module configured to communicate with another OBU. In some embodiments, the OBU comprises a data collection module configured to collect data from external vehicle sensors and internal vehicle sensors; and to monitor vehicle status and driver status. In some embodiments, the OBU comprises a vehicle control module configured to execute control instructions for driving tasks. In some embodiments, the driving tasks comprise car following and/or lane changing. In some embodiments, the control instructions are received from an RSU. In some embodiments, the OBU is configured to control a vehicle using data received from an RSU. In some embodiments, the data received from said RSU comprises: vehicle control instructions; travel route and traffic information; and/or services information. In some embodiments, the vehicle control instructions comprise a longitudinal acceleration rate, a lateral acceleration rate, and/or a vehicle orientation. In some embodiments, the travel route and traffic information comprise traffic conditions, incident location, intersection location, entrance location, and/or exit location. In some embodiments, the services data comprises the location of a fuel station and/or location of a point of interest. In some embodiments, OBU is configured to send data to an RSU. In some embodiments, the data sent to said RSU comprises: driver input data; driver condition data; vehicle condition data; and/or goods condition data. In some embodiments, the driver input data comprises origin of the trip, destination of the trip, expected travel time, service requests, and/or level of hazardous material. In some embodiments, the driver condition data comprises driver behaviors, fatigue level, and/or driver distractions. In some embodiments, the vehicle condition data comprises vehicle identification, vehicle type, and/or data collected by a data collection module. In some embodiments, the goods condition data comprises material type, material weight, material height, and/or material size.

In some embodiments, the OBU is configured to collect data comprising: vehicle engine status; vehicle speed; goods status; surrounding objects detected by vehicles; and/or driver conditions. In some embodiments, the OBU is configured to assume control of a vehicle. In some embodiments, the OBU is configured to assume control of a vehicle when the automated driving system fails. In some embodiments, the OBU is configured to assume control of a vehicle when the vehicle condition and/or traffic condition prevents the automated driving system from driving said vehicle. In some embodiments, the vehicle condition and/or traffic condition is adverse weather conditions, a traffic incident, a system failure, and/or a communication failure.

The technology provides traffic sensing and control at a variety of scales, e.g., at a microscopic level (e.g., to provide traffic sensing and control for individual vehicles with respect to longitudinal movements (car following, acceleration and deceleration, stopping and standing) and lateral movements (lane keeping, lane changing)); at a mesoscopic level (e.g., to provide traffic sensing and control for road corridors and segments (e.g., special event early notification, incident prediction, weaving section merging and diverging, platoon splitting and integrating, variable speed limit prediction and reaction, segment travel time prediction, and/or segment traffic flow prediction); and at a macroscopic level (e.g., to provide traffic sensing and control for a road network (e.g., potential congestion prediction, potential incident prediction, network traffic demand prediction, network status prediction, and/or network travel time prediction).

For example, as shown in FIG. 1, embodiments of the roadside infrastructure sensing system technology comprise sensors and information flow between and among sensors. In some embodiments, the technology provided herein comprises a sensor deployment subsystem configured to evaluate roads, sensor functions, and sensing points to configure sensor and sensor systems. In some embodiments, information (sensor data, environmental data, and/or historical data) are provided to the sensor deployment subsystem and the sensor deployment subsystem evaluates roads, sensor functions, and sensing points to assign sensor types to sensor points, e.g., to provide sensor coverage for a road, road system (e.g., a CAVH system).

Figure 2:
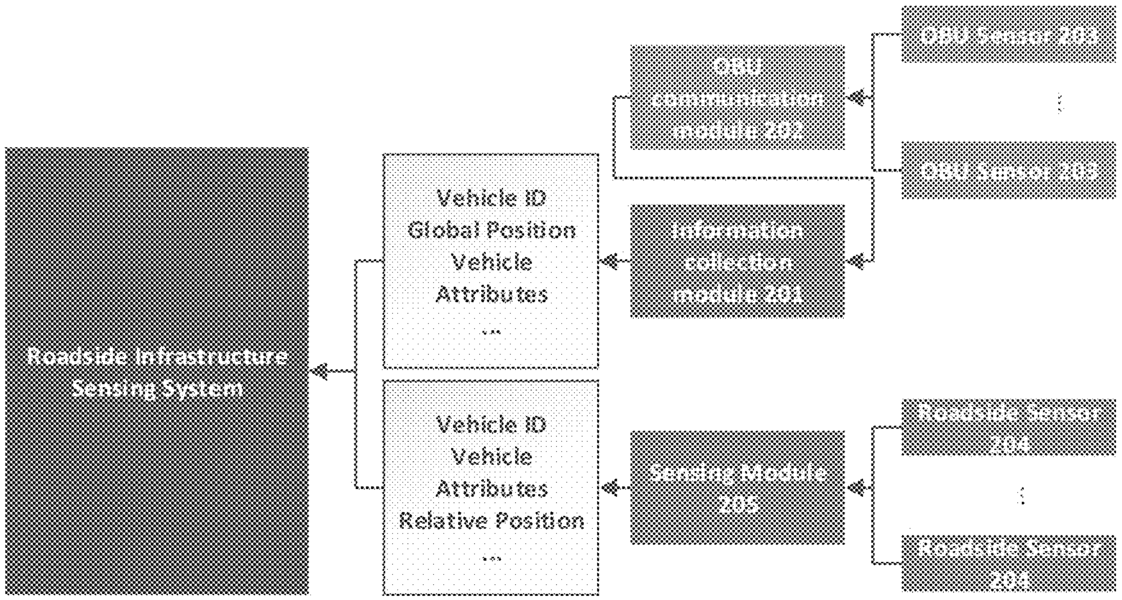
FIG. 2 is a block diagram showing an embodiment of the technology configured to sense, collect, and fuse data for the roadside infrastructure sensing system described herein. Elements of the technology shown in FIG. 2 include, e.g., roadside unit (RSU) information collection modules 201; vehicle onboard unit (OBU) communication modules 202; vehicle OBU sensors 203; RSU sensors 204; and RSU sensing modules 205.

Further, as shown in FIG. 2, embodiments of the technology relate to a roadside infrastructure sensing system configured to sense, collect, and fuse information. In exemplary embodiments, a roadside infrastructure sensing system comprises an information collection module 201, an OBU communication module 202, a vehicle OBU 203, an RSU sensor 204, and/or an RSU 205. In some embodiments, the OBU communication module 202 sends vehicle information and/or data (e.g., vehicle information and/or data sensed by vehicle sensors) through the vehicle OBU 203 (e.g., by wireless communication). The information collection module 201 collects the information sent by the OBU communication module 202 (e.g., by communicating (e.g., wirelessly) with the OBU communication module 202). In some embodiments, vehicle information (e.g., sensed by vehicle sensors) sent by the OBU (e.g., by the OBU communication module) to the information collection module comprises a vehicle identifier, global position data, vehicle attributes, and/or safety messages collected by the vehicle. In some embodiments, the RSU sensing module 205 collects the data (e.g., a vehicle identifier, global position data, and/or relative position data) from RSU sensors 204. Then, embodiments provide that the RSU roadside system collects and fuses the data and information received.

Figure 3:
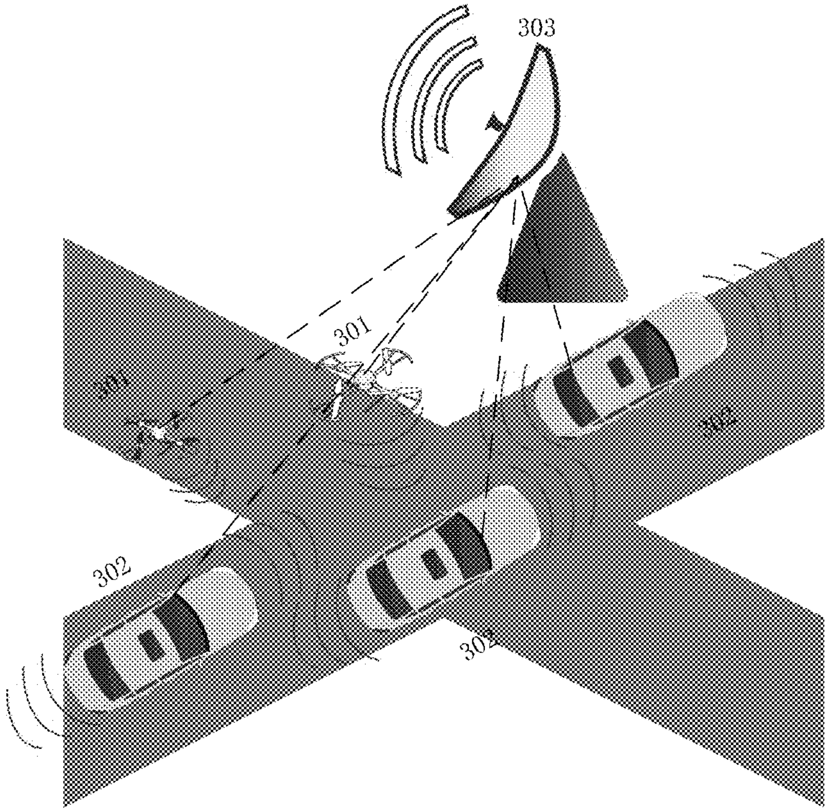
FIG. 3. Is a schematic showing an embodiment of the technology for mobile sensing. Elements of the technology shown in FIG. 3 include, e.g., drone wireless communication 301; vehicle wireless communication 302; and a RSU 303.

In some embodiments, as shown in FIG. 3, the technology relates to mobile sensing, e.g., vehicle based sensing and drone based sensing. In some embodiments, vehicle-based sensing 302 comprises the collective sensing functions of a plurality of vehicles. In some embodiments, a plurality of vehicles sends sensor data and/or vehicle information to an RSU 303 by vehicle wireless communication. In some embodiments, drone-based sensing 301 comprises drones flying near a region. In some embodiments, the drones sense the region, collect sensor data describing the region, and send data and/or information to an RSU using wireless communication.

Embodiments of the technology relate to allocating resources to components, sub-systems, sensors, etc. of a roadside infrastructure sensing system, IRIS, and/or CAVH system. In some embodiments, the term "resource" refers to electrical power, computing power (e.g., computing cycles, memory use, storage use, power consumption, data throughput), communication bandwidth, sensing (e.g., obtaining and/or recording data from a sensor), sensing frequency (e.g., sampling rate), sensor coverage (e.g., sensors per unit area or linear dimension of a road), and/or data fusion capability. In some embodiments, the technology provides increased resources to areas and/or regions of a road system for which system efficiency (e.g., comprising traffic control, safety, vehicle control, power consumption, use of communication bandwidth) for the road, region, and/or system is increased and/or optimized by providing increased resources to said areas and/or regions. In some embodiments, the technology provides decreased resources to areas and/or regions of a road system for which system efficiency (e.g., comprising traffic control, safety, vehicle control, power consumption, use of communication bandwidth) for the road, region, and/or system would be increased and/or optimized by providing decreased resources to said areas and/or regions. As described herein, in some embodiments, the technology comprises providing increased resources to areas having high traffic volume or areas comprising dynamic objects (e.g., an area comprising a dynamic object (e.g., one or more dynamic objects) and/or areas comprising an increase in the number of dynamic objects (e.g., relative to an average number of dynamic objects and/or relative to a previous number of dynamic objects)). In some embodiments, providing increased resources comprises identifying, locating, tracking, and/or controlling dynamic objects. In some embodiments, when resources are not allocated to identifying, locating, tracking, and/or when decreased resources are provided to controlling dynamic objects or resource allocation provided to identifying, locating, tracking, and/or controlling dynamic objects, the system updates a background scene (e.g., identifies and locates static objects and/or identifies, locates, and/or tracks static objects or slow moving objects or non-vehicle objects (e.g., pedestrians, animals, non-moving objects)). In some embodiments, the system comprises determining resource allocation based on determining a ratio of a present and/or predicted resource allocation (e.g., amount of electrical power, computing power (e.g., computing cycles, memory use, storage use, power consumption, data throughput), communication bandwidth, sensing (e.g., obtaining and/or recording data from a sensor), sensing frequency (e.g., sampling rate), sensor coverage (e.g., sensors per unit area or linear dimension of a road), and/or data fusion capability allocated to a region) and the present and/or predicted resource demand for said region (e.g., comprising the number of dynamic objects to identify, locate, track, and/or control).

We claim:

1. A method comprising:

fusing sensor-level data from a plurality of sensors to produce fused sensor data; and allocating resources to sensors based on said fused sensor data, wherein the data source of said fused sensor data comprises vehicle sensors and roadside sensors;

wherein the fused sensor data comprises data describing vehicle surroundings, weather data, vehicle attribute data, traffic state data, road information data, and traffic incident data;

wherein the sensors are configured to provide data for transportation behavior prediction and management, planning and decision-making, and vehicle control at a microscopic level; and wherein said fused sensor data is provided to an intelligent road infrastructure system (IRIS) or to a connected and automated vehicle highway (CAVH) system; and said IRIS or CAVH system provides customized control instructions comprising instructions for vehicle longitudinal acceleration and speed, vehicle lateral acceleration and speed, and vehicle orientation and direction to individual connected and automated vehicles.

2. The method of claim 1, further comprising communicating said fused sensor data to a Connected and Automated Vehicle Highway (CAVH) system.

3. The method of claim 1, further comprising predicting sensor resource requirements based on said fused sensor data.

4. The method of claim 1, further comprising deploying sensors to sensing points based on said fused sensor data.

5. The method of claim 1, wherein said sensor-level data comprises information describing static objects.

6. The method of claim 5, comprising updating the positions of static objects during low traffic volumes or when spare resources are available.

7. The method of claim 1, wherein said sensor-level data comprises information describing dynamic objects.

8. The method of claim 7, comprising updating the positions and/or velocities of dynamic objects during high traffic volumes.

9. The method of claim 1, comprising synchronizing sensor-level data from a plurality of sensors in time or in space.

10. The method of claim 1, comprising generating a background scene comprising static objects.

11. The method of claim 1, comprising updating a background scene during times of both high and low traffic volumes.

12. The method of claim 1, comprising sensing and collecting data vehicle identification information, vehicle global position, vehicle relative position, vehicle velocities, and/or vehicle attributes.

13. The method of claim 1, comprising identifying a sensor as a high priority sensor using a priority system ranking a plurality of sensors, using data describing the environment of specific road segments, and/or at specific times identified by a Traffic Control Unit/Traffic Control Center.

14. The method of claim 1, comprising classifying vehicles, motorcycles, bicycles, pedestrians, and animals.

15. The method of claim 1, comprising identifying the location of vehicles.

16. The method of claim 1, comprising segmenting vehicles on a road using lane markings.

17. The method of claim 1, comprising tracking objects on a road and/or near a road using data and information from sensors at different locations.

18. The method of claim 1, comprising identifying major sensing points for which sensors track and provide sensor data for vehicles, bicycles, pedestrians, lane markings, traffic signs, and static objects.

19. The method of claim 1, comprising tracking and providing sensor data for vehicles, bicycles, pedestrians, lane markings, traffic signs, and static objects at a major sensing point.

20. The method of claim 1, wherein resources are apportioned among vehicle-based sensors and infrastructure-based sensors.

* * * * *